United States Patent
Labay

(10) Patent No.: US 12,454,368 B1
(45) Date of Patent: Oct. 28, 2025

(54) PROTECTIVE COVER FOR FOREIGN OBJECT DAMAGE PREVENTION AND AIRCRAFT PARTS PROTECTION

(71) Applicant: Glenn Thomas Labay, Southampton, MA (US)

(72) Inventor: Glenn Thomas Labay, Southampton, MA (US)

( * ) Notice: Subject to any disclaimer, the term of this patent is extended or adjusted under 35 U.S.C. 154(b) by 0 days.

(21) Appl. No.: 18/814,660

(22) Filed: Aug. 26, 2024

(51) Int. Cl.
*B64F 1/00* (2006.01)

(52) U.S. Cl.
CPC .................................... *B64F 1/005* (2013.01)

(58) Field of Classification Search
CPC ...... B64F 1/005; F02C 7/00; B64D 2033/022; B64D 33/04
See application file for complete search history.

(56) References Cited

U.S. PATENT DOCUMENTS

| | | | | | |
|---|---|---|---|---|---|
| 3,038,631 | A | * | 6/1962 | Calder | F16L 55/1141 138/89 |
| 4,615,460 | A | * | 10/1986 | Buccellato | B64F 5/30 220/DIG. 19 |
| 6,506,014 | B1 | * | 1/2003 | Nolfi | F02C 7/00 415/170.1 |
| 6,871,819 | B2 | * | 3/2005 | Garric | F02C 7/04 244/121 |
| 8,950,701 | B2 | * | 2/2015 | Sparks | B64F 1/005 244/121 |
| 9,476,534 | B2 | * | 10/2016 | Nolfi | F16L 55/134 |
| 9,550,581 | B2 | * | 1/2017 | Loureiro | B64D 29/00 |
| 2007/0267545 | A1 | * | 11/2007 | Orr | B64F 1/005 244/133 |
| 2017/0027796 | A1 | * | 2/2017 | Kaikenger | A61G 7/1042 |

* cited by examiner

*Primary Examiner* — Joshua D Huson
*Assistant Examiner* — Vicente Rodriguez
(74) *Attorney, Agent, or Firm* — The Rapacke Law Group, P.A.

(57) ABSTRACT

A protective cover for foreign object damage prevention is disclosed, including a polyurethane foam body dimensioned to be at least partially received by an inlet and an exhaust of an aircraft. One or more handles are at least partially embedded into a front side of the foam body to enable input and removal of the foam body to and from the inlet. The protective cover protects the aircraft from foreign object damage caused by the ingestion and impact of foreign object debris.

19 Claims, 5 Drawing Sheets

PROTECTIVE COVER FOR FOREIGN OBJECT DAMAGE PREVENTION AND AIRCRAFT PARTS PROTECTION

TECHNICAL FIELD

The embodiments disclosed herein generally relate to aircraft ground support equipment and more specifically to protective covers for foreign object damage (FOD) prevention and parts protection.

BACKGROUND

Foreign object damage (FOD) refers to damage to an aircraft caused by foreign object debris. Common external FOD hazards include hail, ice, sand, bird strikes, ash clouds, and objects left on a runway or flight deck. It is well documented that such hazards can cause significant damage to the aircraft including loss of engine function.

To mitigate risks associated with FOD, aircraft employ various systems which detect and/or prevent the ingestion of foreign object debris into the engine of the aircraft. In particular, radar, electro-optical cameras, RFID on metal (for material and object tracking), FODS mats, and engine exhaust plugs are employed by aircraft and airport facilities for various purposes.

Engine exhaust plugs (also referred to as exhaust engine covers) are used to cover and protect the inlet and exhaust portions of the aircraft's engine(s) during ground operations such as during maintenance, inspections, storage, and ground transportation. These devices are designed to fit into or over the inlet and exhaust sections of the aircraft to prevent the ingestion of foreign object debris.

SUMMARY OF THE INVENTION

This summary is provided to introduce a variety of concepts in a simplified form that is further disclosed in the detailed description of the embodiments. This summary is not intended for determining the scope of the claimed subject matter.

The embodiments provided herein disclose a protective cover for foreign object damage prevention, including a polyurethane foam body dimensioned to be at least partially received by an inlet and an exhaust of an aircraft. One or more handles are at least partially embedded into a front side of the foam body to enable input and removal of the foam body to and from the inlet. The protective cover protects the aircraft from foreign object damage caused by the ingestion and impact of foreign object debris.

In one aspect. the polyurethane foam body is a constructed of a flexible polyurethane foam material.

In one aspect, the one or more handles are each comprised of a first end and a second end, and wherein each of the first end and the second end are embedded within a handle support channel.

In one aspect, each of the one or more handles are rivetted to a washer to retain each of the one or more handles on the front side of the foam body.

In one aspect, each of the one or more handles are constructed of a nylon webbing material.

In one aspect, the polyurethane foam body is resistant to ultraviolet degradation.

In one aspect, the polyurethane foam body is chemical resistant.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1A:
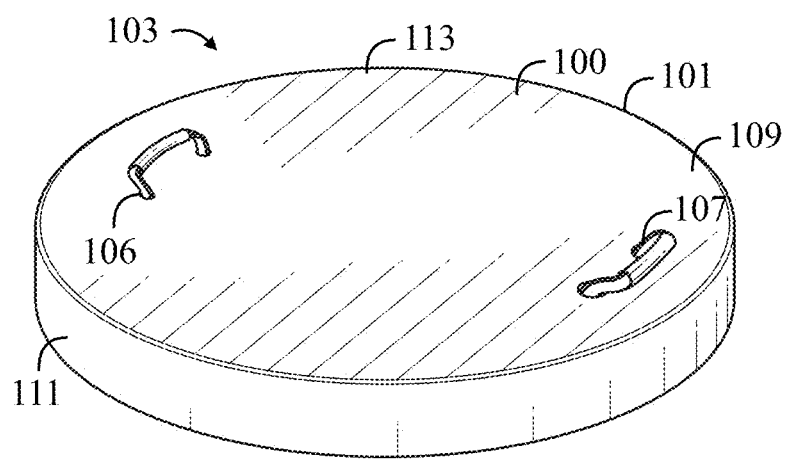
FIG. 1A illustrates a perspective view of the front side of the protective cover in a first configuration, according to some embodiments.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom.

Before describing in detail exemplary embodiments, it is noted that the embodiments reside primarily in combinations of components related to particular devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments provided herein relate to a protective cover for foreign object damage (FOD) prevents and parts protection for an aircraft. The protective cover includes a polyurethane flexible foam core dimensioned to cover or fit at least partially into the inlet and exhaust of the aircraft engine. Each protective cover includes at least one integrated handle to enable the efficient and easy input and removal of the protective cover to and from the aircraft.

In some embodiments, a polyvinyl-chloride (PVC) coating may be applied to the flexible foam core to provide static-dissipative properties.

In some embodiments, the plug includes an integrated handle system to enable input and removal of the plug. The handle straps are rivetted to the washer.

In some embodiments, the handle straps are inserted into handle support channels.

In some embodiments, the handle straps are constructed having thermo-press grips constructed of nylon webbing.

In some embodiments the plugs are constructed of Polyvinyl-chloride (PVC) coated polyurethane flexible foam.

In some embodiments, the plugs are resistant to ultraviolet degradation.

In some embodiments, the protective cover is configured to include static-dissipative properties provided by a PVC coating as a safety feature which is applied over the foam core. Static-dissipative materials, such as PVC are employed to reduce static electricity in order to protect from static discharge to and from human contact and to protect the electrostatic-sensitive devices of the aircraft or protect against explosions due to residual fuel within the engine enclosure.

It is to be understood that the protective cover can be constructed having various shapes, sizes, and configurations which enable its use in various aircraft designs. In such, each of the configurations shown in FIGS. 1A-1B (the first configuration), FIGS. 2A-2B (the second configuration), and FIGS. 3A-3B (the third configuration) are shown by way of example. Each configuration is described herein having a similar construction and components while differing from one another in shape. The functionalities of the protective cover remain the same across each configuration. For clarity, the components of the protective cover are labelled using the same reference numbers across each configuration. Further, it is to be understood that additional shapes, sizes and configurations of the protective cover may be produced which allow for its use in various aircrafts. In such, the components of the protective cover will be discussed in reference to FIGS. 1A-1B to avoid being unduly repetitious. The components and their functionalities and may be applied to FIGS. 2A-2B and FIGS. 3A-3B as well as other non-illustrated embodiments of the protective cover.

Figure 1B:
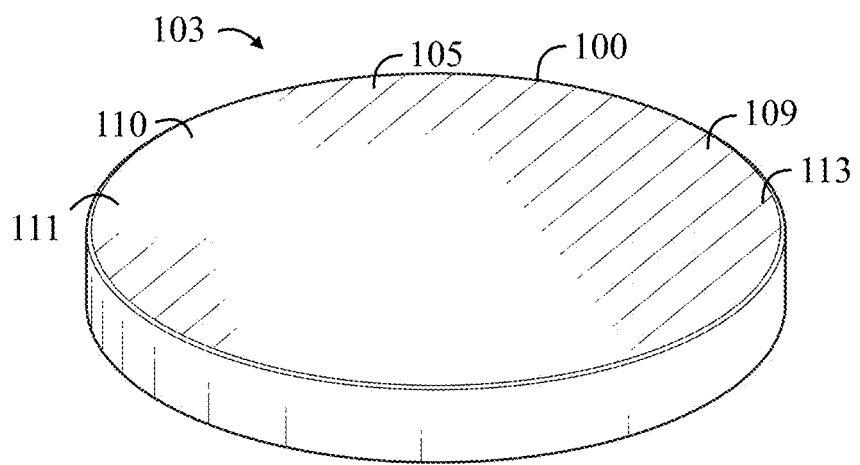
FIG. 1B illustrates a perspective view of the rear side of the protective cover in a first configuration, according to some embodiments.

FIG. 1A illustrates the front side 100 of the protective cover 101 in a first configuration 103. FIG. 1B illustrates the rear side 105 of the protective cover 101 in the first configuration 103. The first configuration 103 may be defined as having a generally circular shape. The front side 100 of the protective cover 101 includes a first handle 106 and a second handle 107 which are utilized to lift and carry the protective cover 101, insert the protective cover 101 into a suitable position within the inlet or exhaust of the aircraft, and remove the protective cover 101 from the inlet or exhaust of the aircraft. The front side 100 and rear side 105 of the protective cover 101 are separated by a foam body 109 which provides a sufficiently thick construction to allow the protective cover 101 to prevent the ingress of objects into the inlet or exhaust of the aircraft. The rear side 105 of the protective cover 101 is constructed as a flat planar surface 110 which faces the internal side of the aircraft inlet or exhaust when properly inserted therein.

In some embodiments, a coating 111 is applied to the exterior surface 113 of the protective cover 101. The coating 111 may be a static-dissipative coating which is applied to coat the foam body 109. The coating 111 may also be applied to protect the foam body 109 from degradation caused by ultraviolet light, chemicals, etc.

In some embodiments, one or more labels may be printed or otherwise displayed on the front side 100 and/or the rear side 105 of the protective cover 101. For example, the label may include instructions for inserting and/or removing the protective cover 101, warnings, branding, part numbers, serial numbers, codes, and the like.

In some embodiments, handles may also be positioned on the rear side of the protective cover. This may facilitate carrying protective cover from either side, or to enable the user to input and remove the protective cover in either direction (i.e., having either side of the protective cover facing the exterior of the engine intake or exhaust).

Figure 2A:
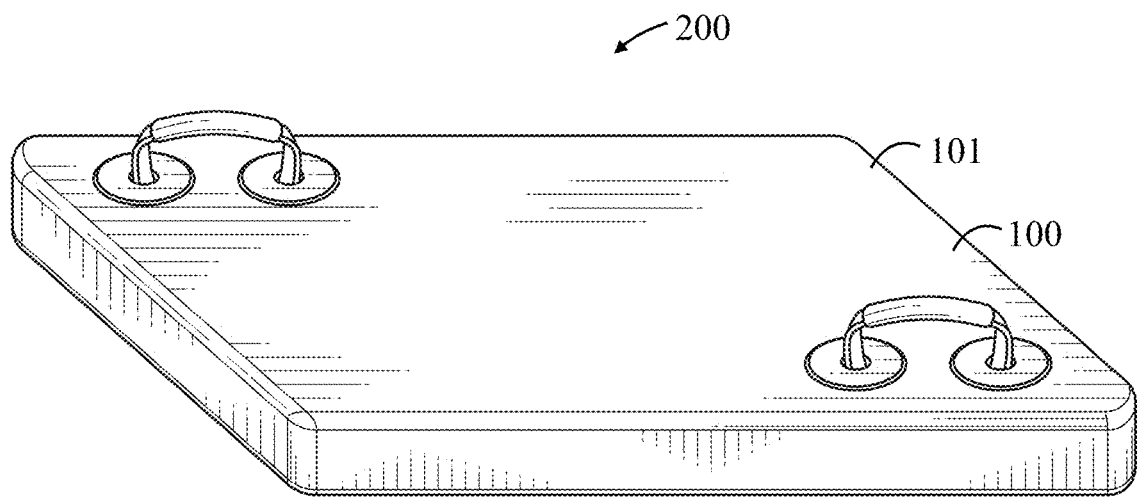
FIG. 2A illustrates a perspective view of the front side of the protective cover in a second configuration, according to some embodiments.
Figure 2B:
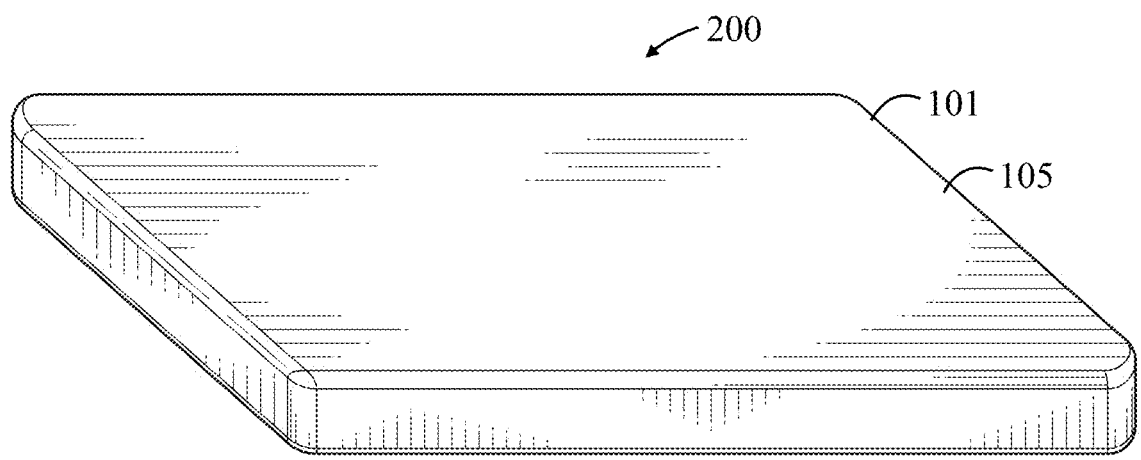
FIG. 2B illustrates a perspective view of the rear side of the protective cover in a second configuration, according to some embodiments.
Figure 3A:
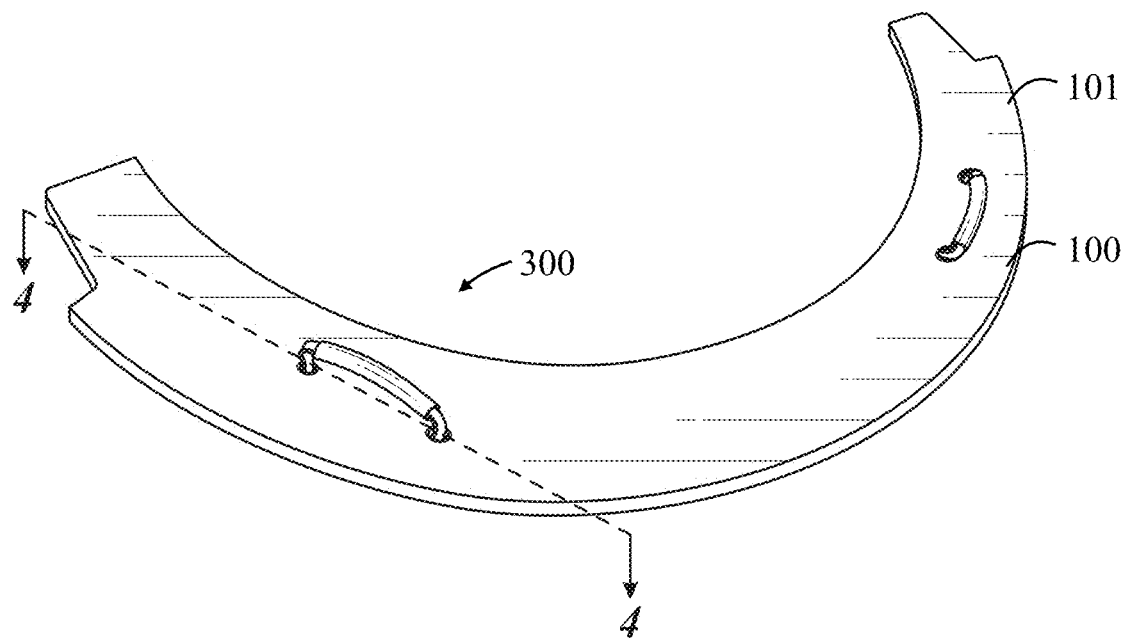
FIG. 3A illustrates a perspective view of the front side of the protective cover in a third configuration, according to some embodiments.
Figure 3B:
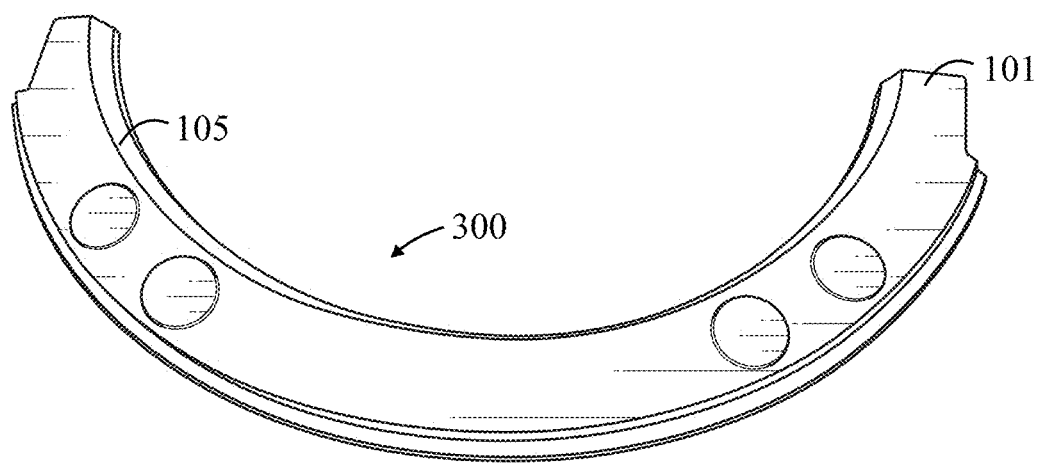
FIG. 3B illustrates a perspective view of the rear side of the protective cover in a third configuration, according to some embodiments.

As mentioned hereinabove, FIGS. 2A-2B and FIGS. 3A-3B illustrate alternative configurations of the protective cover 101 having various shapes (e.g., a trapezoid, crescent, polygonal, etc.). In particular, FIG. 2A illustrates the front side 100 of the protective cover 101 in a second configuration 200. FIG. 2B illustrates the rear side 105 of the protective cover 101 in a second configuration 200. FIG. 3A illustrates the front side 100 of the protective cover 101 in a third configuration 300. FIG. 3B illustrates the rear side 105 of the protective cover 101 in a third configuration 300.

Figure 4:
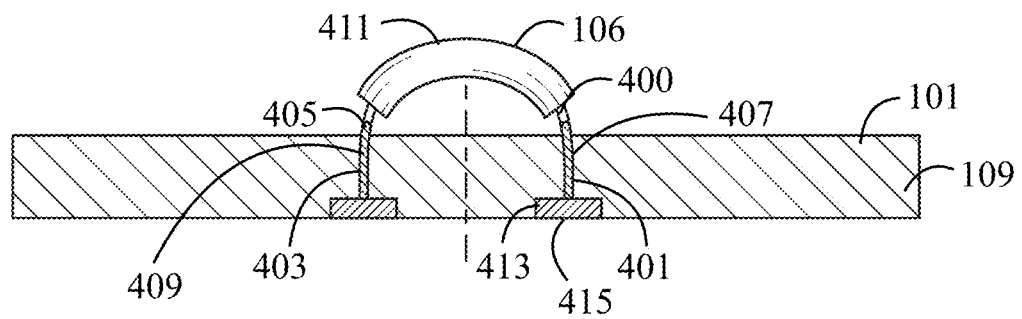
FIG. 4 illustrates a cross-section of the protective cover, according to some embodiments.

FIG. 4 illustrates a cross-section of the protective cover 101 to illustrate the internal components. It is to be understood that while the first handle 106 is used by way of example, the construction and functionalities described using the first handle 106 can be applied to the second handle and any additional handles provided on the protective cover 101. The handle 106 includes a strap 400, a first end 401 and a second end 403. The strap 400 is constructed of a nylon webbing material 405 which provides a sufficiently strong material which can withstand pulling and pressing forces applied by the operator while resisting rips and tears which may form throughout repeated use. The first end 401 is at least partially inserted into a first handle support channel 407 while the second end 403 is at least partially inserted in a second handle support channel 409. Each handle support channel 407, 409 extends partially through the foam body 109. A grip 411 is positioned over and extends along at least a portion of the length of the strap 400.

In further reference to FIG. 4, a plastic washer 413 is attached via rivets 415 to rear interior wall 417 of the foam body 109 to anchor each end of the strap 400 thereto. The rivets 415 ensure that the first and second ends of the strap 400 are securely attached to the protective cover 101 while extending from the handle support channels 407, 409.

In some embodiments, the grip 411 is a thermopress grip having molding to comfortably interface with the hand of the operator. The grip 411 provides a larger surface area for the operator to comfortably grasp while manipulating the protective cover 101.

Figure 5:
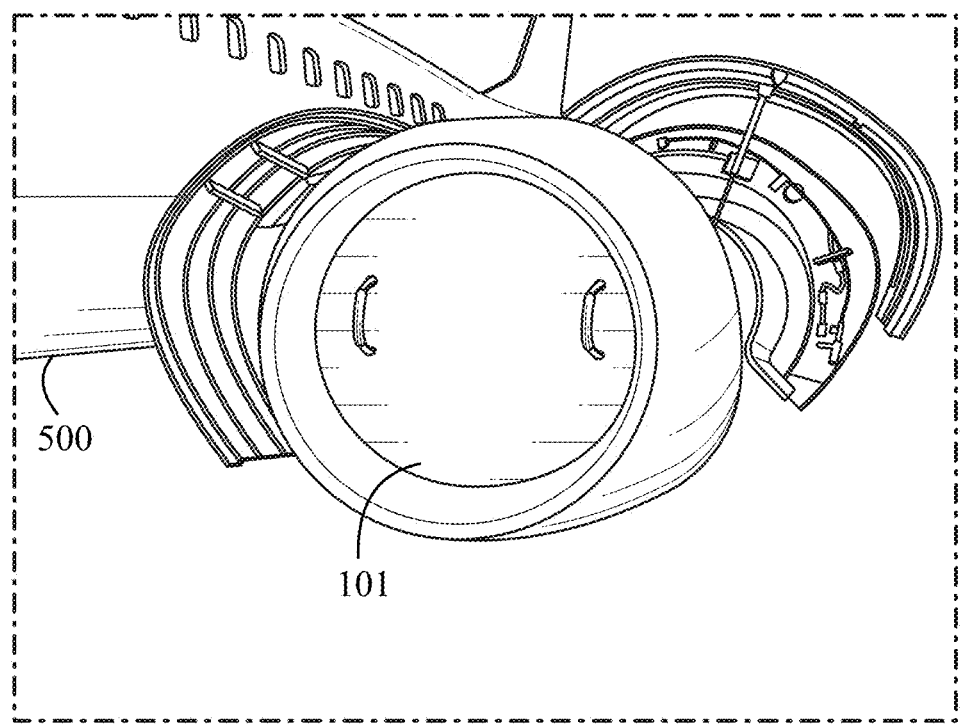
FIG. 5 illustrates a perspective view of an aircraft utilizing the protective cover, according to some embodiments.
Figure 6:
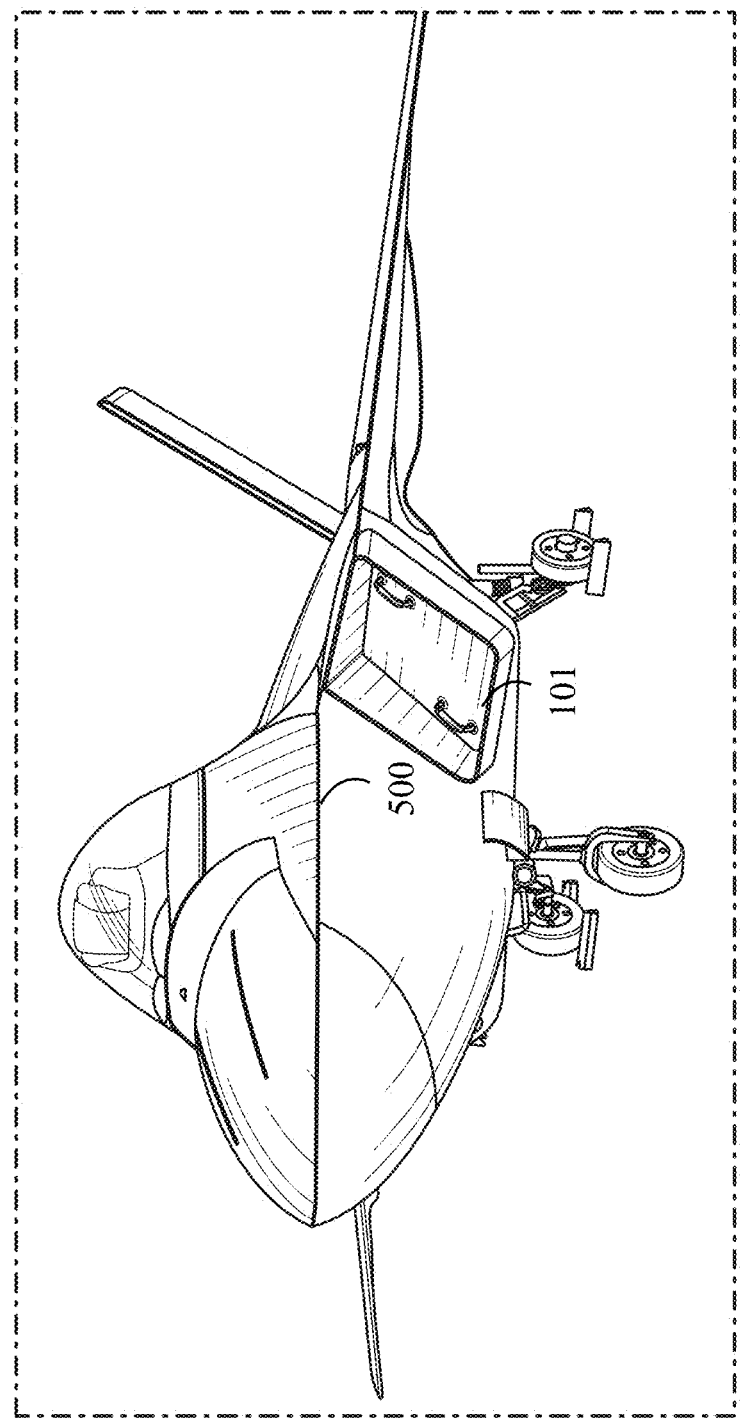
FIG. 6 illustrates a perspective view an aircraft utilizing the protective cover, according to some embodiments.

FIG. 5 and FIG. 6 illustrate an aircraft 500 utilizing the protective cover 101. During use, the operator selects a suitable protective cover 101 which is insertable into the intake and/or exhaust of the aircraft. The protective cover 101 is configured to sufficiently block the intake and/or exhaust such that foreign object cannot damage the aircraft components.

During production of the protective cover 101 the manufacture determines a suitable size, configuration, and shape of the protective cover and constructs a foam body using various techniques known in the arts. If desirable, a coating is applied to the exterior of the foam body to provide protective properties and/or static-dissipative properties.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety to the extent allowed by applicable law and regulations.

The systems and methods described herein may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The foregoing is provided for purposes of illustrating, explaining, and describing embodiments of this disclosure. Modifications and adaptations to these embodiments will be apparent to those skilled in the art and may be made without departing from the scope or spirit of this disclosure.

As used herein and in the appended claims, the singular forms "a", "an", and "the" include plural referents unless the context clearly dictates otherwise.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic intervening entities) and the indirect coupling of two entities (with one or more non-negligible intervening entities). Where entities are shown as being directly coupled together or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described herein. A variety of modifications and variations are possible in light of the above teachings without departing from the following claims.

What is claimed is:

1. A protective cover for foreign object damage prevention, comprising:
    a polyurethane foam body dimensioned to be at least partially received by an inlet or an exhaust;
    wherein the polyurethane foam body is dimensioned and shaped to reversibly interface with both the inlet and exhaust of an aircraft; and
    one or more handles at least partially embedded into a front side of the polyurethane foam body to enable input and removal of the polyurethane foam body to and from the inlet, wherein the protective cover protects the aircraft from foreign object damage caused by the impact of foreign object debris, wherein each end of the handle is secured within a corresponding recessed handle support channel formed into the front side of the polyurethane foam body.

2. The protective cover of claim 1, wherein the polyurethane foam body is a constructed of a flexible polyurethane foam material.

3. The protective cover of claim 1, wherein the one or more handles are each comprised of a first end and a second end, and wherein each of the first end and the second end are embedded within a handle support channel.

4. The protective cover of claim 3, wherein each of the one or more handles are rivetted to a washer to retain each of the one or more handles on the front side of the polyurethane foam body.

5. The protective cover of claim 4, wherein each of the one or more handles are constructed of a nylon webbing material.

6. The protective cover of claim 1, wherein the polyurethane foam body is resistant to ultraviolet degradation.

7. The protective cover of claim 1, wherein the polyurethane foam body is chemical resistant.

8. A protective cover for foreign object damage prevention, comprising:
    one or more foam bodies each dimensioned to be at least partially received by at least one of an inlet or an exhaust of an aircraft wherein the one or more foam bodies are dimensioned and shaped to reversibly interface with both the inlet and exhaust of the aircraft;
    a static-dissipative coating applied to coat the one or more foam bodies;
    at least two handles at least partially embedded into a front side of the each of the polyurethane foam bodies to enable input and removal of each of the foam bodies to and from the inlet and the exhaust, wherein the protective cover protects the aircraft from foreign object damage caused by the impact of foreign object debris, wherein the one or more handles are each comprised of a first end and a second end, and wherein each of the first end and the second end are embedded within a handle support channel; and a nylon webbing material wrapped around each of the least two handles.

9. The protective cover of claim 8, wherein the static-dissipative coating is polyvinylchloride.

10. The protective cover of claim 8, wherein each of the one or more foam bodies is a constructed of a flexible polyurethane foam material.

11. The protective cover of claim 10, wherein each of the one or more handles are rivetted to a washer to retain each of the one or more handles on the front side.

12. The protective cover of claim 11, wherein each of the one or more handles are constructed of a nylon webbing material.

13. The protective cover of claim 8, wherein each of the one or more foam bodies is resistant to ultraviolet degradation.

14. The protective cover of claim 8, wherein each of the one or more foam bodies is chemical resistant.

15. A static-dissipative protective cover system for foreign object damage prevention, the system comprising:

one or more first foam bodies dimensioned to be at least partially received by an inlet of an aircraft wherein the one or more first foam bodies is dimensioned and shaped to reversibly interface with both the inlet and exhaust of the aircraft;

one or more second foam bodies dimensioned to be at least partially received by an exhaust of the aircraft wherein the one or more second foam bodies is dimensioned and shaped to reversibly interface with both the inlet and exhaust of the aircraft;

a static-dissipative coating applied to coat the one or more first foam bodies and the one or more second foam bodies;

a first handle support channel and a second handle support channel each at least partially embedded into the one or more first foam bodies and the second one or more foam bodies;

at least two handles each including a first end and a second end, wherein the first end is attached to the first handle support channel, and wherein the second end is attached to the second handle support channel, wherein the static-dissipative protective cover protects the aircraft from foreign object damage caused by the impact of foreign object debris, wherein each end of the handle is secured within a corresponding recessed handle support channel formed into the front side of the polyurethane foam body.

16. The static-dissipative protective cover of claim 15, wherein the static-dissipative coating is polyvinyl-chloride.

17. The static-dissipative protective cover of claim 15, wherein each of the one or more handles are constructed of a nylon webbing material.

18. The static-dissipative protective cover of claim 15, wherein the coating of the one or more first foam bodies and the one or more second foam bodies is resistant to ultraviolet degradation and chemical degradation.

19. The static-dissipative protective cover of claim 15, wherein each of the one or more first foam bodies and the one or more second foam bodies are tear resistant and retain protective capabilities if punctured or torn.

* * * * *